Jan. 31, 1961     C. B. ELLIS     2,970,098
ELECTRODIALYSIS APPARATUS
Filed Nov. 4, 1957     3 Sheets-Sheet 1
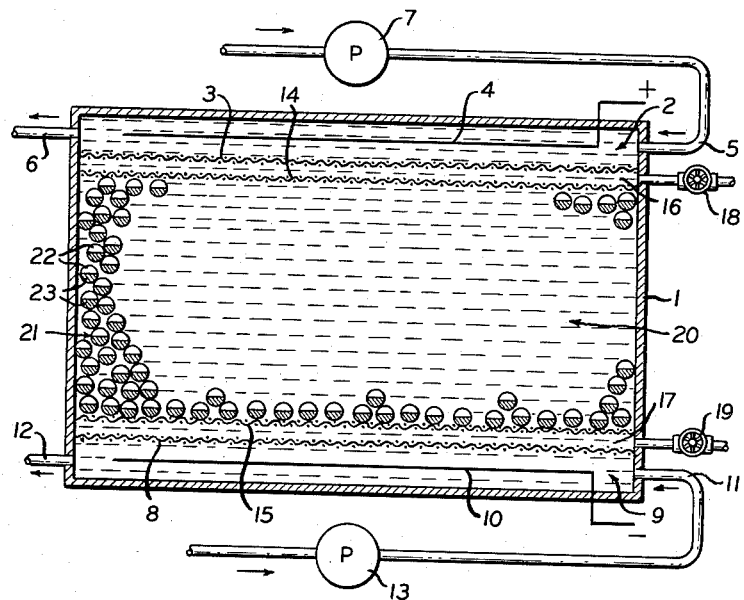
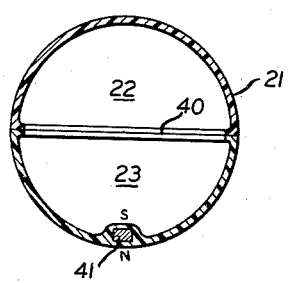
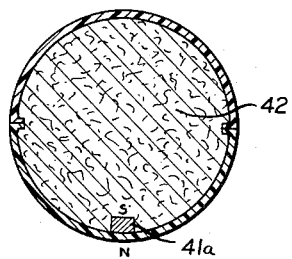
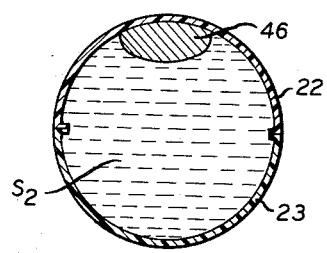
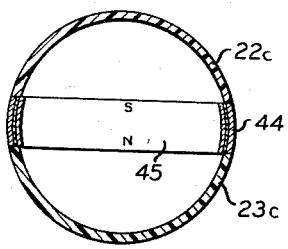
INVENTOR
Carl B Ellis
BY
ATTORNEY Jan. 31, 1961

C. B. ELLIS 2,970,098

ELECTRODIALYSIS APPARATUS

Filed Nov. 4, 1957

INVENTOR
Cecil B Ellis
BY
ATTORNEY

Jan. 31, 1961

C. B. ELLIS 2,970,098

ELECTRODIALYSIS APPARATUS

Filed Nov. 4, 1957

INVENTOR
Cecil B Ellis
BY
ATTORNEY

United States Patent Office 2,970,098
Patented Jan. 31, 1961

2,970,098

ELECTRODIALYSIS APPARATUS

Cecil B. Ellis, 104 Grandview Ave., White Plains, N.Y.

Filed Nov. 4, 1957, Ser. No. 694,375

17 Claims. (Cl. 204—301)

This invention relates to electrodialysis apparatus and methods.

More particularly, the invention is concerned with the separation of dissolved ionizable substances from a solvent by the use of anion permeable ("minus-passing membrane," "anion membrane") and cation permeable ("plus-passing membrane," "cation membrane") membranes or the transfer of dissolved ionizable substances from one body of liquid to another. In a simple form of device, a permselective membrane (either anion permeable or cation permeable) may be used as a diaphragm seperating two bodies of liquid containing, respectively, an anode and cathode so that electric current flowing between anode and cathode causes passage of one type of ions (as, for example, $Na^+$) through the diaphragm while blocking passage of other ions (as, for example, $OH^-$) in the opposite direction, thus altering the concentration of dissolved substances in the anodic and cathodic compartments. This action may be accompanied by removal of ions from solution, as by plating out, precipitation or dissipation as a gas. In another simple system, spaced permselective membranes may be utilized to form three compartments, an anodic compartment, an intermediate compartment and a cathodic compartment, the intermediate compartment being separated from the anodic and cathodic compartments respectively by permselective membranes, one of which passes anions and the other of which passes cations. A variety of actions is possible with an apparatus of this character, a typical action being the purification of liquid in the intermediate compartment by removal of citations and anions as, for example, removal of salt by selective movement of $Na^+$ ions through the cation permeable membrane and of $CL^-$ ions through the anion permeable membrane.

A simple single cell apparatus of the type indicated possesses, however, certain limitations which have led to the use of multiple cell arrangements involving a large number of diaphragms or membranes, alternately anion permeable and cation permeable, interposed between the anode and cathode compartments. One form of multiple cell arrangement is discussed, for example, in Ion Exchange Technology (Academic Press, 1956), chap. 6, the applicable principles being thoroughly discussed therein and in the literature there cited. The known principles of operation will be referred to in detail in the present application, only so far as necessary for a full understanding of the present invention, reference being made to this and other available literature for any further details of operation and construction. The essential characteristics of the apparatus are not, in general, affected by specific geometry, as, for example, by whether the membranes are set as parallel flat elements, concentric tubular elements, corrugated forms, etc., and in general, where the operation of prior art arrangements is discussed in the present application, it will be assumed, for simplicity, that the arrangement consists essentially of alternating flat cation exchange and anion exchange membranes with alternate compartments between membranes hydraulically connected together in series or parallel. Considerations of electrical efficiency make it desirable that the membranes be as thin as possible and that the spacing between membranes be as small as possible, giving rise to obvious difficulties in maintaining the membranes in position and in forming the necessary fluid flow connections to the laminar compartments between membranes. In general, the active ion exchange or permselective membrane requires support by a suitable grid or frame, as shown in Ion Exchange Technology, although this decreases the fluid space within each compartment for given spacing of membranes. In practical structures operated at practical rates of fluid flow, the flow in the spaces between membranes tends to be laminar so that the liquid in contact with the membranes is depleted or concentrated, as the case may be, decreasing the efficiency of operation since the power required to move ions between the two solutions varies in proportion to the logarithm of the ratio of ion concentration at the two surfaces of the membrane. As a result of the considerations just mentioned, the design of multiple cell electrodialysis apparatus is very much a matter of compromise, and the apparatus is difficult and expensive to fabricate and maintain.

It is the general object of the present invention to provide an electrodialysis apparatus and method which minimizes the difficulties mentioned above.

Another object of the invention is to provide an electrodialysis apparatus which eliminates the need for complicated assembly operations and permits assembly and replacement at the place of operation by relatively unskilled personnel, thus reducing shipping, installation and maintenance costs, as well as expensive shut downs or other processes due to an apparatus being out of commission.

In many of the embodiments described herein, membrane units can be removed for inspection and overhaul and reinstalled, ready for operation, in vast numbers simultaneously in one simple hydraulic flow type of process, without any need for attention to individual membrane units.

A third object is to provide an apparatus in which the geometry is not dictated by the structural considerations indicated above, so that the liquid body volumes and membrane dimension may be selected or determined according to the particular requirements of the specific process involved, resulting in increased efficiency.

As one instance, the previous systems usually operated with a rather large pressure difference between the two sides of the membranes, which required either very thick and rugged membranes or intricate support systems. The alternatives to these pressure differences involved flow patterns of either decreased efficiency or increased complexity of pumps and piping. In the method of the present invention, the pressure difference across the membranes is never large enough to be important and so the membranes can be made of very thin material. This reduces the membrane resistance, which cuts down the electric power requirement for the process, and also reduces the mass of ion exchange resin material which must be purchased for making the membranes.

In general, the present invention utilizes an apparatus consisting of an operating electrodialysis chamber, defined by suitable permeable and impermeable walls, associated with suitable anode and cathode compartments and containing a number of sealed unit cells or closed unit containers having walls partly of cation permeable membrane and partly of anion permeable membrane, these unit containers dividing the electrodialysis chamber into a space exterior to the unit cells and a space (in the form of a multiplicity of unit spaces) in the interior of the unit cells, which two spaces are occupied by the liquid bodies being treated. The unit cells are orientated so that the wall portions of cation permeable membrane face, at least predominantly, toward one electrode and those of anion permeable membrane face, at least predominantly, toward the other electrode, so that current passing between anode and cathode causes transfer of ions between the space external to the unit cells and the space inside the unit cells.

The method and apparatus of the present invention differ from hitherto known electrodialytic processes for utilizing ion exchange resins, in that, in such processes, it has hitherto been the practice to introduce and remove the influent and effluent liquids through openings provided for that purpose in the cells or compartments defined by the permselective membranes, and it is essentially this characteristic of prior art processes which has given rise to the difficulties above mentioned. It may be noted that ion exchange methods utilizing granular resins together with chemical regeneration do not present comparable difficulties, but are limited in their use by the need for expensive chemical regeneration of the granular resins and also, in some cases, by contamination from non-ionizable substances, which can be prevented in the electrodialytic processes.

The method and apparatus of the present invention does not involve the use of openings for the introduction and removal of liquids to and from the unit container cells, which may, accordingly, be handled and used somewhat after the fashion of granular resins but which present also the advantages of the electrodialytic process in eliminating the need for chemical regeneration and in obtaining separation of possibly reacting substances. The method of the present invention thus combines advantageous characteristics of previous granular resin and permselective membrane methods, being similar to the granular resin methods heretofore used, in that expensive, delicate and difficultly manufactured apparatus is not necessary and similar to prior electrodialytic methods, in that chemical regeneration is eliminated (the electrolytic regeneration of the present method being very much simpler and less expensive) and separation of the liquids is maintained.

The drawing illustrates schematically an apparatus and method embodying the invention in a preferred form.

In the drawing:

Fig. 1 is a schematic section of one form of apparatus suitable for practicing the invention;

Fig. 2 is a vertical section, much enlarged, of one form of unit compartment or capsule used in the apparatus of Fig. 1;

Figs. 3, 3A, 4 and 5 are sections similar to Fig. 2, but showing modifications;

Figure 6A:
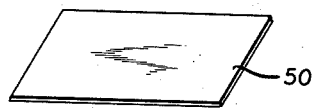
Figs. 6A to 6F are schematic views showing a method of making the capsules of Figs. 3 and following.

There is indicated generally at 1 a tank or container, the walls of which may be made of insulated metal, plastic or other suitable material from the standpoint of mechanical strength, electrical insulating properties and chemical inertness. At the top of the tank 1 is positioned an anodic compartment 2, separated from the tank generally by an anion permeable membrane 3 and containing the anode or anodes 4. The compartment 2 may be filled with any suitable conducting electrolyte, such as saline solution or other salt solution, depending on the liquid being processed, and any of the now used anode materials may be employed. Liquid circulation may be maintained through the anode compartment 2 as by means of inlet connection 5, outlet connection 6 and a pump 7. At the bottom of the tank 1 and below a similar but cation permeable membrane 8 is the cathodic compartment 9, containing a suitable cathode or cathodes 10, through which circulation of suitable electrolyte or conducting liquid may be maintained by means of inlet connection 11, discharge 12 and pump 13. Two screens 14 and 15 may be provided adjacent the membranes 3 and 8, forming liquid discharge and entrance compartments 16 and 17, respectively. Effluent liquid is discharged from the compartment 16 through the valved discharge connection 18 and influent liquid is admitted to the compartment 17 through the valved connection 19. The space 20 between the screens or porous diaphragms 14 and 15 is filled with a multiplicity of unit containers 21, shown as spherical in form. The upper unshaded portion 22 of each container 21 may be formed of plus-passing membrane, while the lower shaded portion 23 may be formed of minus-passing membrane. As will appear, this arrangement may be reversed, placing the minus-passing membrane above and plus-passing membrane below. In general, a large number of unit container cells 21 will be utilized and these cells may have dimensions ranging from about a thousandth of an inch in diameter (or least diameter, if not spherical in form), up to as large as an inch or thereabouts. The considerations affecting the choice of unit container shape, size, wall thickness and specific structure will be indicated below. Entrance compartments 16 and 17 are suitably proportioned and may have diffuser vanes, flow distributing screens for equalizing flow into and out of the space 20 through screens 14 and 15.

Various methods for orientating and arranging the capsules 21 will be discussed below. For the present, it will be assumed that the capsules 21 are arranged as indicated in Fig. 1. In the simplest type of batch operation, the apparatus generally will, at the start of a cycle, be filled with liquid to be processed (as, for example, a solution of salt or brackish water, to be purified), filling the space, $S_1$, surrounding the capsules 21 and the space, $S_2$, within the capsules themselves will be full of liquid of appropriate properties (in the example indicated, fresh water or somewhat brackish water). The liquid in the anode and cathode compartments may be of any suitable type (as, for example, a sufficiently conductive saline solution, in the case indicated). Application of current between anode and cathode initiates a general migration or movement of cations (e.g. $Na^+$) toward the cathode (downward, in the apparatus of Fig. 1) and of anions (e.g. $Cl^-$) toward the anode (upward, in the apparatus of Fig. 1). However, any direct path from anode to cathode passes through a large number of interstitial spaces between cells or capsules 21 and through a large number of these capsules, such a direct path being composed of (1) a portion of space $S_1$, (2) a cation permeable membrane 22, (3) a portion of space $S_2$ within a capsule 21, (4) an anion permeable membrane 23, and (5) another portion of space $S_1$, etc. etc. As will be apparent, the ions will migrate in both directions in the spaces $S_1$, $S_2$ but will pass selectively through the membranes 22, 23 in such a manner that the concentration of both positive and negative ions in the space $S_1$, surrounding the capsules 21, decreases and the concentration in the space $S_2$, within the capsules 21, increases. In actuality, the equipotential surfaces in an apparatus such as that of Fig. 1 will not be plane surfaces and the lines of current flow and ion migration, normal to these surfaces, will not be straight lines or direct geometrical paths. In general, these surfaces will be locally curved due to the different resistivities of the liquid in space $S_1$, the liquid in space $S_2$ and the cation and anion permeable membranes 22, 23 and the form of the equipotential surfaces will change as the ionic concentrations change. However, the form of these surfaces will, in general, be such that, (a) they form a number of non-intersecting and locally almost parallel surfaces, and (b) a normal curve to these surfaces, or path of least resistance, will always pass through a large number of spaces $S_2$ within capsules 21.

As the operation continues, the dissolved substance (in the example selected, NaCl) is removed from the liquid being treated in the space $S_1$ into the liquid within the space $S_2$, and the process is continued until the liquid being treated reaches the desired state of dilution or purity. Thereafter, the purified liquid is removed through the connection 18 and the capsules 21 are "regenerated" during the other half of a cycle by filling the container with the scavenger liquid through connection 19 and repeating the process, but with the current flowing in the opposite direction, so that ions are removed from space $S_2$ into space $S_1$. When the liquid within the capsules has been restored to the desired dilution, the scavenging liquid is flushed out and the apparatus may be recharged and the operation cycle repeated.

As will be understood, the process may be carried out in one or more stages as proves convenient in any given class of work and as dictated by the economic and other considerations involved.

Thus, the liquid in $S_1$ may be partially purified in electrodialysis cell 1 and then sent to one or more other similar electrodialysis cells, which might more conveniently be operated at different voltages or liquid volume ratios or flow rates, to complete the purification process. Recycling fractions of the liquids between one electrodialysis cell and another might prove beneficial in some types of processes, according to principles well known in process plant technology.

Figure 9:
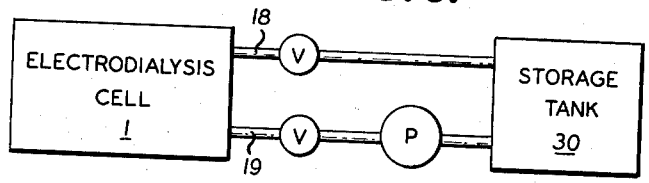
Fig. 9 is a schematic showing one method of utilizing the apparatus of Fig. 1.

A unit such as shown in Fig. 1 could also be employed with continuous circulation of the liquid within space $S_1$ as shown schematically in Fig. 9. In this case, the liquid may be pumped at a suitable rate between a storage container 30 and the electrodialytic cell 1 until the desired purity has been reached. As will be apparent, the capacity of the storage compartment 30 may be chosen at will and in particular this element may be reduced to a mere pipe connection, in which case the apparatus of Fig. 9 maintains circulation without disturbing the essential volumetric relationships between the spaces $S_1$ and $S_2$.

An additional advantage over the prior art of parallel plane alternating membrane compartments is that with the arrangement described here it is easy to arrange simple piping to provide a profuse flow of small gas bubbles passing upwards through the bed of capsules, if so desired. This will create additional turbulence in the liquid spaces $S_1$ just outside the membrane walls of the unit capsules and so help to break up the static layers of overly depleted or concentrated solution next to the membranes which have already been mentioned. With the prior parallel compartment arrangements, it is much more difficult to introduce a gas supply into each compartment without causing objectionable leakages.

Figure 10:
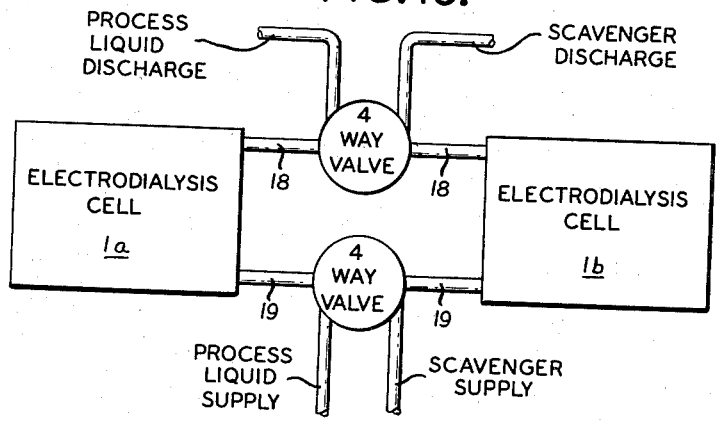
Fig. 10 is a schematic showing a second method of using the apparatus of Fig. 1.

A number of cells such as shown in Fig. 1 may also be utilized in a variety of ways according to principles which are well understood in themselves, one simple manner of so utilizing two cells being shown in Fig. 10. As indicated in that figure, two cells 1a and 1b may be used, with suitable valving for connecting them to an influent supply and discharge and to a scavenger supply and discharge. Such an arrangement would permit the finished product liquid to be delivered more nearly continuously instead of in intermittent batches, provided the valve changes and electrode polarity changes were synchronized so that one cell was always generating product when the other was having its unit capsules regenerated.

Another useful method of operation which may be preferable in some types of applications is to keep the influent liquid flowing into the cell and flowing out as finished product continuously for the first half of each cycle, instead of holding this liquid within the system until an entire batch was finished and then discharging it all at one time. As soon as the concentration of ions extracted from space $S_1$ reached the maximum desirable amount within the unit-capsules, the input valve would then be switched instantaneously to send in the scavenger liquid immediately behind the remainder of the liquid still being purified. Shortly thereafter the electrode polarity would be reversed, and whenever the interface between purified product liquid and impure scavenger liquid reached the exit connection, the exit valve would be switched to send the emerging liquid to scavenger discharge instead of to the product lines. When the unit cells had become sufficiently regenerated, the entrance valve would be returned instantaneously to feeding influent liquid. Subsequent to restoration of the original electrode polarity, an interface between impure scavenger liquid and purified product liquid would reach the exit valve, whereupon the latter would return the emerging flow to the product lines. Combining such a continuously flowing system, having continuous utilization of the electric power, with an alternating parallel cell arrangement such as illustrated in Fig. 10, would provide a system with truly continuous and uniform flow of product output, whenever this might be desirable.

The description to follow of methods or orientating the unit capsules within the electrodialysis tank will make it clear that some methods will require the liquids to be kept continuously flowing upwards in the tank, while with other arrangements the liquids may be stationary while the voltage is being applied. Likewise, with some orientating methods the liquids are required to flow always upwards in the tank, but with others the liquids may flow downwards or horizontally across the tank. In the latter case, it is not necessary for the general flow path of the liquids to be parallel to the general direction of the electric current flow, but the anode and cathode may, if desired, be placed at opposite sides of the tank instead of at the top and bottom.

These various alternatives for the engineering construction and the hydraulic flow arrangements give the general method here described a high degree of flexibility for adaptation to many different types of solution operations. The method has been illustrated above in its application to the purification of water, such as seawater, natural brackish waters, industrial wastes, etc. Many other applications of the general principles of electrodialysis, which are described in detail in the literature may also be carried out most advantageously by the new method described here. Some of these will involve the addition or subtraction of certain ions to or from one or more solutions. Others will involve bringing two or more different kinds of ions together, separating them from their previous surroundings and transporting them by electrodialysis, so as to cause them to enter into a desirable chemical reaction. The present method could well be used to carry out chemical reactions within the unit cells described above, under precisely controlled ionic and nonionic surroundings, so long as the reactions did not form precipitates which would fill up the pores of the membranes.

The individual capsules 21 may take a form such as shown in Fig. 2, comprising two substantially hemispherical elements 22 and 23, respectively joined together along a seam line 40, one hemisphere, as previously indicated, being composed of cation permeable membrane and the other hemisphere being composed of anion permeable membrane. A magnetic element 41 embedded in the lower part of the hemisphere 23 may be utilized to assist in the orientation of the captules within the space 20 in the container 1, the various magnetic elements 41 being set in the individual capsules 21 so that their poles are orientated in the same direction, as, for example, in the case illustrated, the magnets 21 being set so that their north poles face outwardly (downwardly in the figures) and their south poles inwardly. Any suitable permanent magnet or electro-magnetic means placed close to but outside the apparatus may then be utilized for orientating the capsules within the space 20, by applying a magnetic field in a direction roughly parallel to the direction of electrolytic current flow. During the orientation, a steady or intermittent flow of liquid may be maintained so as to jostle the capsules and assist the action of the magnetic field in producing the desired orientation. Instead of discrete magnetic element being embedded in one of the hemispheres, another method is to use in the fabrication of one of the hemispheres ion exchange resin membrane material which is impregnated throughout with fine particles of ferromagnetic material of good magnetic retentivity. The membrane sheet can then be permanently magnetized by conventional external means to have an effective north pole on one side and an effective south pole on the other. Orientation of an assemblage of such capsules in the electrodialysis tank can then be accomplished by an external magnetic field as already described.

A quite different method of orientation is to cause the hydrodynamic upward force on a capsule from liquid flowing upward through the tank to act against the downward force of gravity on the capsule to provide a torque which rotates the capsule into the desired alignment. The simplest way to do this is just to give the capsules the proper streamlined shape—not the spherical shape hitherto assumed—so that the upward-flowing stream lines them up all the same way. Numerous shapes having this property are well known to the aeronautical art. It is only necessary that the capsule shape be such that when the liquid is impinging upon the desired face the center of hydrodynamic pressure lies downstream from the center of gravity of the capsule and its contents.

For applications where a somewhat greater liquid flow rate is desired, the stability of capsules oriented by the hydrodynamic method can be increased by embedding a small weight, made of any very dense material, within that face of the capsule which is desired to be downward in the tank. This will provide a greater torque to rotate each capsule until its heavy side is downward.

The best method of orientating will depend on the other aspects of the particular application for which the present invention is being used. The magnetic methods have two advantages for some applications: (a) quite high liquid flow rates can be used without disrupting the orientation, simply by increasing the strength of the external magnet; and (b) liquid flow through the electrodialysis tank can be roughly in a horizontal direction at all times, rather than upward, which somewhat simplifies the liquid handling methods for a large system. On the other hand, the hydrodynamic orientating methods will require somewhat less expenditure of energy, and so may be preferable whenever high liquid flow rates are not needed. In particular, the latter will also work for the batch process arrangements in which the liquids are at rest during the period of application of voltage. The capsules can orient themselves while falling through stationary liquid in settling down to rest as a packed bed in the lower part of the tank, after each charge of liquids.

The capsule may also be formed around a core or supporting structure having the form of a ball or other desired shape, as shown in Fig. 3. In this case, the core 42 may be made of glass wool or any spongy material having sufficient mechanical strength to support the capsule wall and having no connected pores, so as not to interfere with flow or liquid, or ions. Where a supporting core is utilized, the weight or magnet 41a may conveniently be embedded in this core, if desired.

In still another modification, the capsule may be provided with an external supporting shell 43, which again will be of a porous character, as, for example, of woven screen material, and in this case also the magnet or weight 41b may be attached to the supporting shell 43, if desired.

The capsule may also take a form such as indicated in Fig. 5, comprising a segment 22c of cation permeable membrane, a segment 23c of anion permeable membrane and a central zone 44 of impermeable material joining the sections 22c and 23c. In this case, the central zone 44 may comprise or contain a ring-shaped magnet 45 for orientation purposes.

As indicated in Fig. 3A, a capsule otherwise like that of Fig. 2 may contain a globule of immiscible liquid 46 or similar particle of solid material, in addition to the ordinary liquid contained within the space $S_2$, wherever such globule or particle may be desirable for catalytic auxiliary treatment or other purposes.

Ordinarily the capsules are of generally spherical shape, but this is not essential to the invention in its broader aspect, nor it is essential that the capsules be packed as closely as possible. It is ordinarily desirable to adjust the intensity of the orientating force until the capsules arrange themselves in a manner permitting adequate space for flow around the capsules while interrupting any passage for current flow around the capsules so as to insure a high probability for an ion to be trapped inside before it has travelled very far between the anodic and cathodic compartments. For some applications, the capsules should almost all be in contact, but for others the economic balances between such variables as the cost of pumping power, the cost of electric power, and the cost of membranes per unit area, will require the capsules to be somewhat separated. In general, the process will become considerably less efficient if the capsule separation distances average very much greater than the dimensions of the capsules.

Figure 6B:
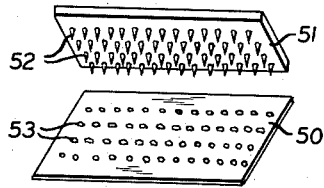
Figure 6C:
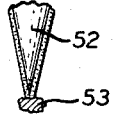
Figure 6D:
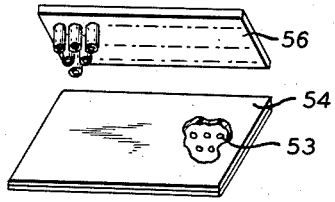
Figure 6E:
Figure 6F:
Figure 7A:
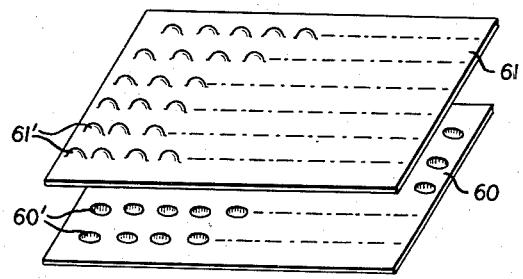
Figs. 7A to 7D are schematic views showing a second method of making these capsules.
Figure 7B:
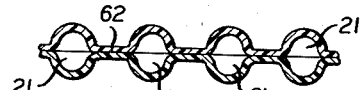
Figure 7C:
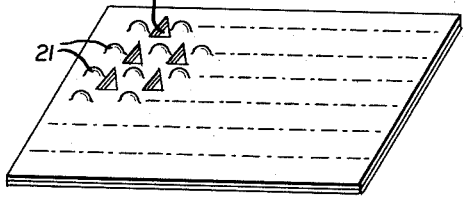
Figure 7D:
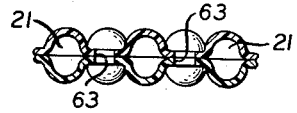

The capsules may be formed in any convenient manner, one such method being shown in Figs. 6A–6F. As shown in Fig. 6A, a sheet 50 of suitable anion membrane may be utilized, this sheet being initially prepared by means of a plate 51 carrying a large number of points 52 which may be prepared with suitable adhesive and dipped in granular magnetic material 53, or else very dense granular material, as indicated on an enlarged scale in Fig. 6C. This element is then pressed against the sheet 50, as indicated in Fig. 6B, forcing the magnetic or very dense particles 53 into its surface. As will be understood, this operation is carried out with suitable heat and/or adhesives to insure the firm attachment of the particles 53. Thereafter, the particles may be magnetized by the application of a suitable magnetic field, if the magnetic method of orientating is being used, and a sheet 54 of cation permeable membrane may be placed over the sheet 53, and local pressure applied thereto by means of heated dies comprising a number of tubular elements 55 carried on a die plate 56 and heat sealing the elements 53 and 54 together while punching out individual collapsed capsules, each containing a particle 53. Thereafter the collapsed capsules (Fig. 6E) are subjected to electro-osmosis treatment to fill their interiors with liquid and expand them into generally spherical form as indicated in Fig. 6F, at which point they are ready for use as described above.

Alternatively, capsules may be prepared as indicated in Figs. 7A–7D, utilizing sheets 60 and 61 of anion and cation permeable membranes, these sheets having recesses 60' and 61' and being sealed together around these recesses so as to form a number of capsule elements 21 joined by flat sheet material 62 sealed together under the action of heat and pressure. The capsules 21 may be cut out of the thus formed elements and utilized as previously described, or openings 63 may be punched in the material between capsules 21, providing space for fluid flow and the sheets may then be stacked in the space 20 within the electrolytic cell 1, the action of the cell being substantially as previously described.

Figure 8:
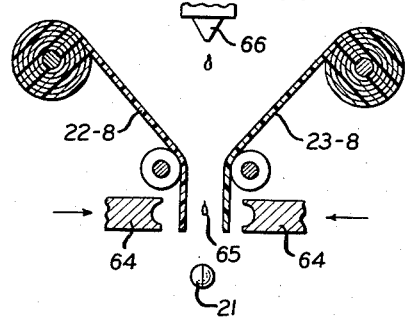
Fig. 8 is a sectional view showing a third method of making the capsules.

The capsules may also be formed, as indicated in Fig. 8, by the method which is widely used in preparing medicinal capsules. In this case, two strips of cation and anion permeable material 22–8 and 23–8 are fed to a die apparatus 64 and forced together around a falling globule of liquid 65 supplied by the liquid supply head 66, being sealed under heat and pressure around this globule to form a completed capsule 21. The magnetic or dense material elements 41 may previously be embedded in the strip 23–8, thus producing a capsule substantially like that shown in Fig. 2.

What is claimed is:

1. Electrodialytic liquid treatment apparatus comprising an electrodialytic cell having a pair of spaced electrodes, and a space for liquid treatment between the electrodes, a plurality of closed capsules disposed within the said space between electrodes and substantially filling the said space, the said capsules being of small size in all dimensions compared to the said space, and being so arranged that a line of current flow between electrodes passes through a plurality of such capsules and an equi-potential surface also passes through a plurality of such capsules, each such capsule comprising opposed wall portions which are respectively selectively anion permeable and selectively cation permeable, the said capsules being arranged so that the anion permeable wall portions face toward one said electrode and the cation permeable wall portions face toward the other said electrode.

2. Electrodialytic liquid treatment apparatus comprising an electrodialytic cell having a pair of spaced electrodes, and a space for liquid treatment between the electrodes, a liquid inlet and discharge for said space, a plurality of closed capsules disposed within the said space between electrodes and substantially filling the said space, but leaving interstices for fluid flow around the capsules between the inlet and discharge, the said capsules being of small size in all dimensions compared to the said space, and being so arranged that a line of current flow between electrodes passes through a plurality of such capsules and an equi-potential line also passes through a plurality of such capsules, each such capsule comprising opposed wall portions which are respectively selectively anion permeable and selectively cation permeable, the said capsules being arranged so that the anion permeable wall portions face toward one said electrode and the cation permeable wall portions face toward the other said electrode.

3. Electrodialytic liquid treatment apparatus comprising an electrodialytic cell having a pair of spaced electrodes and a space for liquid treatment between the electrodes, a plurality of closed capsules disposed within the said space between electrodes and substantially filling the said space, the said capsules being of small size volumetrically and in largest diameter compared to the said space, and being so arranged that a line of current flow between electrodes passes through a plurality of such capsules and an equi-potential line also passes through a plurality of such capsules, each such capsule comprising opposed wall portions which are respectively selectively anion permeable and selectively cation permeable, the said capsules being arranged so that the anion permeable wall portions face toward one said electrode and the cation permeable wall portions face toward the other said electrode.

4. Electrodialytic liquid treatment apparatus comprising an electrodialytic cell having a pair of spaced electrodes and a space for liquid treatment between the electrodes, a plurality of substantially spherical closed capsules disposed within the said space between electrodes and substantially filling the said space, the said capsules being of small size compared to the said space, and being so arranged that a line of current flow between electrodes passes through a plurality of such capsules and an equi-potential line also passes through a plurality of such capsules, each such capsule comprising opposed wall portions which are respectively selectively anion permeable and selectively cation permeable, the said capsules being arranged so that the anion permeable wall portions face toward one said electrode and the cation permeable wall portions face toward the other said electrode.

5. Electrodialytic liquid treatment apparatus according to claim 4, in which the said capsules comprise means for orientating them as stated.

6. Electrodialytic liquid treatment apparatus according to claim 5, in which the orientating means comprises a weight affixed to each capsule for orientating it by gravity.

7. Electrodialytic liquid treatment apparatus according to claim 5, in which the orientating means comprises a magnet affixed to each capsule.

8. Electrodialytic liquid treatment apparatus according to claim 4, in which the said capsules have diameters in a range from about .001" to about 1.00".

9. A capsule for use in ion exchange electrodialytic cells comprising a capsule wall having opposed portions which are respectively selectively anion permeable and selectively cation permeable, the said wall defining a single globular internal space, and means for orientating the said capsule in a body of liquid to be treated.

10. A capsule for use in ion exchange electrodialytic cells comprising a capsule wall having opposed portions which are respectively selectively anion permeable and selectively cation permeable, and an eccentric weight for orientating the said capsule in a body of liquid to be treated.

11. A capsule for use in ion exchange electrodialytic cells comprising a capsule wall having opposed portions which are respectively selectively anion permeable and selectively cation permeable, and means for displacing the center of gravity of the said capsule from its volumetric center whereby the capsule will orientate itself by gravity when immersed.

12. A capsule according to claim 11, in which the center of gravity and volumetric center are located on a line substantially joining the centers of the anion permeable and cation permeable wall portions.

13. A capsule for use in ion exchange electrodialytic cells comprising a capsule wall having opposed portions which are respectively selectively anion permeable and selectively cation permeable, and a magnet carried by the said wall for orientating the said capsule in a body of liquid to be treated.

14. A capsule according to claim 13, in which the magnet is located substantially at the center of one said wall portion and has its magnetic axis passing substantially through the center of the other.

15. A capsule according to claim 9, comprising an inert porous shell surrounding and supporting the said opposed wall portions.

16. A capsule according to claim 9, comprising an internal porous support for said opposed wall portions.

17. A capsule according to claim 9, comprising a liquid substantially filling the said capsule and a body of immiscible material immersed in the said liquid.

References Cited in the file of this patent

UNITED STATES PATENTS

| | | |
|---|---|---|
| 2,741,595 | Juda | Apr. 10, 1956 |
| 2,799,644 | Kollsman | July 16, 1957 |

FOREIGN PATENTS

| | | |
|---|---|---|
| 759,275 | Great Britain | Oct. 17, 1956 |

OTHER REFERENCES

Meyer et al.: "Helvetica Chimica Acta," vol. 23 (1940), pp. 795–800.